United States Patent Office 3,316,221
Patented Apr. 25, 1967

3,316,221
AROMATIC ESTER COCATALYSTS FOR LACTAM POLYMERIZATION
Thomas J. Hyde, Woodbury, N.J., assignor to E. I. du Pont de Nemours and Company, Wilmington, Del., a corporation of Delaware
No Drawing. Filed July 1, 1963, Ser. No. 292,071
13 Claims. (Cl. 260—78)

This invention relates to a process, and more particularly to an improved process for the polymerization of lactams to polyamides.

The polymerization of caprolactam to give 6-nylon, a polyamide, has been known for many years. The earliest processes for this polymerization were slow, requiring several hours, and involved the use of water or acidic reagents as polymerization catalysts. Subsequent work showed that anhydrous caprolactam could be polymerized above 200° C. in the presence of strongly basic materials, particularly the alkali and alkaline earth metals, their hydrides, hydroxides, alkoxides, oxides, alkyls or amides. More recently, it has been disclosed that the base catalyzed polymerization of caprolactam and other lactams can be made especially fast by the addition of certain compounds which function as cocatalysts. Particularly effective cotatalysts which have been disclosed include acylating agents such as acyl halides, anhydrides and the like; isocyanates, and compounds containing tertiary nitrogen having at least two of the three substituents on the nitrogen atom consisting of carbonyl, thiocarbonyl, sulfonyl, phosphenyl, thiophosphenyl and nitroso radicals.

The present invention provides an improved process for rapidly polymerizing lactams. More particularly, the process of this invention is an improvement in the process for polymerizing lactams in the presence of lactam-base salts, which improvement comprises carrying out said polymerization in the presence of a cocatalyst comprising at least one of certain aromatic esters of organic acids. The cocatalysts employed in the subject invention are aromatic esters having an exocylic carboxylate group bonded through the ether oxygen therein directly to aromatic carbon. When the carbonyl carbon in said carboxylate group is bonded to any radical in the remainder of the ester it is bonded to one of the group consisting of carbon and tertiary nitrogen, any acyclic, that is, wholly noncyclic, chain separating said carboxylate group from another such carboxylate group bearing at least four carbon atoms in the chain. Aromatic esters free of nonbenzenoid unsaturation containing at least one of the aforementioned carboxylate groups per 30, and preferably 20 carbon atoms are preferred. As described more fully hereinafter, polymeric esters are particularly preferred.

The term "aromatic ester" as used herein refers to an ester in which the ether oxygen of the carboxylate group is attached directly to a carbon atom in an aromatic ring. Thus, the esters used in this invention can be defined as aromatic esters of organic acids, that is, esters of phenols and organic acids, wherein the carbonyl carbon of the carboxyl groups therein in addition to being bonded to ether oxygen are bonded to hydrogen or carbon, or, in the case of N-disubstituted carbamic acids, tertiary nitrogen. Acids of which the cocatalysts of this invention are esters are one or more of organic monobasic acids, carbocyclic polybasic acids and aliphatic polybasic acids bearing at least four carbon atoms between any two carboxyl groups. In the aforementioned acids, the moieties bonded to carbonyl carbon, including the two substituents bonded to tertiary nitrogen in carbamic acids, can be aliphatic, cycloaliphatic or aromatic and are preferably aliphtically saturated, that is, free of non-benzenoid unsaturation. Illustrative monobasic acids include aliphatic acids such as formic acid, acetic acid, chloroacetic acid, propionic acid, butyric acid, caproic acid, lauric acid, cyclohexaneacetic acid, stearic acid, phenylacetic acid, and diethylcarbamic acid; aromatic acids such as benzoic acid, ortho-nitrobenzoic acid, naphthanoic acid, and diphenylcarbamic acid; and cycloalphatic acids such as cyclohexanecarboxylic and cyclopentanecarboxylic acid. Examples of carboxylic polybasic acids, that is, acids bearing at least two carboxyl groups and a carbocyclic ring in the chain between the carboxyl groups, bonded either directly or through an aliphatic chain to the carboxyl groups, are aromatic acids such as phthalic acid, isophthalic acid, terephthalic acid, bibenzoic acid, trimellitic acid, naphthalene-1,5-dicarboxylic acid and phenylene-1,4-bis(N-phenyl carbamic acid) and cycloaliphatic acids such as cyclohexane-1,4-dicarboxylic acid and cyclopentane-1,2-dicarboxylic acid. Illustrative aliphatic acids include adipic acid, benzene diacetic acid, pimelic acid, suberic acid, cyclohexane-1,4-diacetic acid, sebacic acid and 2-ethyladipic acid. Ester-forming derivatives such as anhydrides, salts, esters and acid halides of the aforementioned acids can also be used in forming the aromatic esters. Examples of such ester-forming derivatives are benzoyl chloride, adipyl chloride, terephthaloyl chloride, sebacoyl chloride, phthalic anhydride, dimethyl terephthalate, etc.

Illustrative phenols which can be used in preparing the aromatic esters are phenol, o-chlorophenol, pentachlorophenol, o-nitrophenol, hydroquinone, resorcinol, diphenlolethane, diphenylolpropane, chloroesorcinol, catechol, methoxycatechol, phloroglucinol, 1,5-dihydroxynaphthalene, naphthanol, bis(hydroxyphenyl)ether and mixtures of the aforementioned phenols.

In addition to aromatic esters prepared by the condensation of separate phenolic and carboxylic components, aromatic esters employed in this invention can be prepared from compounds such as p-hydroxybenzoic acid and N-hydroxyphenyl-N-phenylcarbamic acid which contain both phenolic and ester-forming substituents. Thus, the terms "aromatic ester," "aromatic ester of a phenol and an organic acid," and the like are used herein to include not only the condensation products of separate phenolic and organic acid components, but, in addition, those exocyclic esters obtained from ester-forming derivatives of the acids as well as from compounds containing both phenolic and carboxylate-forming substituents.

Aside from the critical aromatic carboxylate functionality of the aromatic esters used in this invention, as indicated above both the acid and phenolic portions thereof can bear substituents such as halogen, alkyl, aryl, alkylene, arylene, nitro, COOM where M is metal, amino, alkoxy, or aryloxy radicals, or other aromatic, aliphatic, cycloaliphatic or inorganic substituents provided only that under the polymerization conditions such substituents do not inhibit polymerization. Preferably, any substituents on the phenolic or carbocyclic moieties of the aromatic esters are non-acidic, that is, free of groups which consume base such as —COOH and primary and secondary —NO₂ groups, although, even with aromatic esters containing such acidic groups, if additional base is employed and such acidic substituents are neutralized, e.g., to —COONa or =NO₂Na, such aromatic esters are suitable in the process of this invention.

The polymers of this invention are made by conventional means. Schildknecht "Polymer Processes," Interscience, 1956, discusses suitable methods. For example, poly(1,4-phenylene-N-phenyl carbamate) is made by the reaction of N-phenyl-4-aminophenol and phosgene.

Examples of monomeric cocatalysts of the present invention are: phenyl propionate, 2-naphthyl butyrate, 2-(1-aminonaphthyl) stearate, resorcyl diacetate, phloroglucyl tripropionate, diphenyl 1,1-cyclohexanedicarboxylate, diphenyl 1,4-cyclohexanedicarboxylate, di(4-aminophenyl) terephthalate, phenyl p-aminobenzoate, 2,6-naphthyl diacetate.

The preferred aromatic ester cocatalysts of the present invention are polymeric esters having the following repeating structural unit:

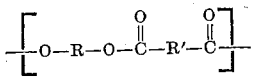

wherein R is an aromatic biradical bonded through aromatic carbon to the oxygen atoms adjacent thereto and R' is an aromatic, aliphatic, or cyclo aliphatic biradical bonded by at least one of the group consisting of carbon and tertiary nitrogen directly to the carbonyl radicals adjacent thereto. By the above definition of the R' biradical we intend to include radicals wherein at least one of the free bonds is on nitrogen bonded to aromatic, cycloaliphatic or aliphatic carbon. As previously indicated, when in R' the chain of atoms linking the adjacent carbonyl radicals is wholly aliphatic, such chain contains at least four cabon atoms. The number of the above repeating units in the aforementioned polymeric esters is greater than 1, and preferably about from 10 to 500.

The polymeric esters of this invention have the advantage that they thicken lactam streams containing them and thus reduce the tendency of fillers or other additives to settle out during polymerization. Polyamides made using the polymeric esters are also crosslinked as evidenced by gel particles formed when the polyamide is dissolved in formic acid. Examples of polymeric cocatalysts of the present invention are:

(1) Poly(hydroquinone adipate)—where $\eta_{inh}=0.05$ to 5.0.
(2) Poly(diphenylolpropane terephthalate)—where $\eta_{inh}=0.05$ to 5.0.
(3) Poly(5-chlororesorcinol 1,4-cyclohexanedicarboxylate)—where $\eta_{inh}=0.05$ to 5.0.
(4) Poly(4-methoxycatechol sebacate)—where $\eta_{inh}=0.05$ to 5.0.
(5) Poly(2-amino-1,5-dihydroxynaphthalene phloionate)—where $\eta_{inh}=0.05$ to 5.0.
(6) Poly(diphenylolpropane adipate)—where $\eta_{inh}=0.05$ to 5.0.
(7) Poly(diphenylolpropane 5-tert-butylisophthalate)—where $\eta_{inh}=0.05$ to 5.0.
(8) Poly[(hydroquinone N,N'-diphenyl)phenylene bis(carbamate)]—where $\eta_{inh}=0.05$ to 5.0.
(9) Poly(1,4-phenylene N-phenylcarbamate)—where $\eta_{inh}=0.05$ to 5.0.
(10) Poly(diphenylolpropane 5-chloroisophthalate)—where $\eta_{inh}=0.05$ to 5.0.
(11) Poly(2,2',6,6'-tetrachlorodiphenylolpropane 5-chloroisophthalate)—where $\eta_{inh}=0.05$ to 5.0.
(12) Poly(diphenylolbutane isophthalate)—where $\eta_{inh}=0.05$ to 5.0.
(13) Poly(2,2',6,6'-tetrachlorodiphenylolbutane terephthalate)—where $\eta_{inh}=0.05$ to 5.0.
(14) Poly(diphenylolpropane terephthalate)—where $\eta_{inh}=0.05$ to 5.0.
(15) Poly(4-hydroxybenzoate)—where $\eta_{inh}=0.05$ to 5.0.
(16) Poly(4-hydroxy-2-chlorobenzoate)—where $\eta_{inh}=0.05$ to 5.0.
(17) Poly(4-hydroxy-4'-biphenylcarboxylate)—where $\eta_{inh}=0.05$ to 5.0.
(18) Poly(m-hydroxybenzoate)—where $\eta_{inh}=0.05$ to 5.0.
(19) Poly(4-hydroxy-2-nitrobenzoate)—where $\eta_{inh}=0.05$ to 5.0.

The molecular weight of the polymeric cocatalysts used in the process of this invention can be characterized by the inherent viscosity, determined as shown in the examples. In general, the inherent viscosity of the preferred polymers can range from 0.05 to about 5.0 with the preferred range being from about 0.2 to about 2.0.

The polymerization process of this invention is particularly effective in producing rapidly high molecular weight polyamides from lactams containing from 3 to 12 or more carbon atoms in the lactam ring. Such lactams include pyrrolidone, piperidone, ε and γ-caprolactam, enantholactam, caprylolactam, laurolactam and mixtures thereof. Generally, the anionic polymerization process can be carried out at temperatures above the melting point of the lactam monomer but below the melting point of the resulting polyamide. In general, this temperature range is from about 25° C. to about 200° C., depending on the particular lactam employed. With lactams containing less than 6 carbon atoms in the lactam ring, the preferred temperature of polymerization is below 150° C. ε-Caprolactam is readily polymerized by the process of this invention at temperatures between 100 and 200° C. with 150° C. being a convenient operating temperature.

The lactam-base salts used in the process of this invention are prepared by the reaction of bases with a lactam. Generally, the lactam to be polymerized is used for the preparation of the anionic catalyst; but if desired, the anionic catalyst can be prepared from another lactam. When the process of this invention is described herein as being carried out in the presence of a base, reference is made to base in the form of the aforementioned basic lactam base salts.

The base employed to form the anionic catalyst, that is, lactam-base salts, can be an alkali metal, an alkaline earth metal, or a basic derivative of one of these metals such as hydroxide; alkoxide, hydride, alkyl, aryl, or amide. All of these bases are of the type which are strong enough to convert the lactam to its basic iminium salt. Thus, sodium hydroxide, potassium hydroxide, lithium hydroxide, magnesium hydroxide, calcium hydroxide, strontium hydroxide, lithium hydroxide, sodium hydride, sodium methoxide, sodium methyl, sodium ethyl, sodium phenyl, sodium naphthyl, sodamide, and the like are suitable bases for the preparation of the anionic catalyst. The bases can be used as such or admixed with diluents to delay absorption of moisture. These diluents can be such materials as mineral oil and other hydrocarbon materials (aromatic, alicyclic or aliphatic). A partially hydrogenated terphenyl sold under the name of HB-40 is a particularly effective diluent from the standpoint of compatibility with polymeric systems.

The anionic catalyst, that is, lactam-base salt, can be prepared by heating the lactam with a base at a temperature between about 25 and 225° C. However, if the lactam base salt is to be held for long periods the temperature will be kept below 125° C. The base can be added to the total lactam which is to be polymerized or to a portion of the lactam which is to be polymerized and this portion of the resultant lactam containing the anionic catalyst added to more of the lactam later. Little or no polymerization occurs during the preparation of the anionic catalyst carried out between the melting point of the lactam and about 225° C. The time required for this step in the process depends upon the strength of the base employed, the proportion added, and the temperature chosen and can be from a few seconds to several hours. Preferably, the lactam should be essentially anhydrous as should the added base. The concentration of the base usually is such as to provide a final concentration for the polymerization in the range of between 0.1 and about 10 mole percent based on the lactam polymerized. Proportions in the higher end of this range produce lower molecular weight polyamides, so optimum proportions for most purposes are from about 0.2 to 5 mole percent of the strong base. The cocatalyst can be employed in proportions varying from about 0.1 to about 5.0 weight percent based on the total lactam to be polymerized. The cocatalyst can be added to the lactam containing the anionic catalyst, or equally well the cocatalyst can be dissolved in a separate portion of the lactam and the two portions of lactam mixed at the time the polymerization is desired. For optimum operation of the process of this invention an inert gas such as nitrogen is bubbled through the molten lactam during the initial reaction with the basic catalyst in order to remove any low molecular weight compound formed such as water and in order to prevent oxidation. Alternatively, the reaction of the lactam with the basic catalyst can be carried out under reduced pressure in which case the low molecular weight compound is distilled from the lactam.

The process of this invention is useful in rapidly preparing cast articles of any size and shape from lactams. The process can be employed to obtain unusual shapes which would be difficult, if not impossible, to obtain by conventional molding or prepolymerized polyamides. The process has the advantage when used in this fashion that high temperatures and high pressures normally required in injection molding and similar processes are not necessary. Therefore, simpler lighter weight molds can be employed and faster cycles can often be obtained in the preparation of large shaped articles. The entire process can be carried out in the mold or, if desired, the lactam solution containing the anionic catalyst and a second portion of the lactam solution containing the cocatalyst can be mixed and then immediately cast into the mold by procedures similar to transfer molding to obtain the desired shaped article in any sizes at a very high rate. Similarly, it is possible to employ the process of this invention in many extrusion-type operations, in which the lactam containing the cocatalyst are intimately mixed and then extruded under conditions which provide for obtaining an extrudate which is polymerized as it is formed.

The process of this invention is operable in the presence of various fillers and reinforcing agents. Thus, if desired, glass mats or mats of synthetic fibers can be impregnated with the solution and rapidly cured. Similarly, finely-divided fillers can be suspended in the polymerizing mixture to obtain filled polyamides. Antioxidants, blowing agents, plasticizers, other resins (e.g., styrene, acrylic, nylon, polyester), colorants, and the like may also be employed. The process of this invention contemplates the use of the process under all of the above conditions.

The process of this invention can likewise be used in the presence of a gas-generating material to give foamed plastic articles. The gas-generating material can be a low boiling liquid or an unstable compound which releases gas when heated. The process of this invention likewise can be carried out as a coating process in which the lactam solution containing anionic catalyst and the cocatalyst is applied as a liquid to the surface of a web such as paper or a textile and then permitted to polymerize to the polyamides and thus form a coating of polyamide film on a substrate.

The invention is more thoroughly illustrated with the aid of the following examples. Parts and percentages where given are by weight.

*Examples 1 through 25*

Two portions of ε-caprolactam are prepared, one containing the catalyst and one the cocatalyst, each containing 11.3 parts of ε-caprolactam and the quantities of catalyst or cocatalyst, respectively, listed in the following table. Each of these portions is melted, the catalyst (e.g., 0.100 part sodium hydride) or cocatalyst (e.g., 0.200 part phenyl benzoate) is added, and brought to 150° C. The molten solution containing catalyst is sparged for several minutes. The molten solution containing the cocatalyst is sparged for several minutes also, except this step is omitted when a volatile cocatalyst is used. The two solutions are mixed and sparged for 30 seconds with nitrogen. If the cocatalyst used is insoluble in the lactam at 150° C. bubbling of nitrogen through the lactam is continued, otherwise not. The course of the polymerization is observed visually and the time from the addition of the cocatalyst to the time at which no perceptible flow of the melt occurs when the reaction vessel is held at a 45° angle is observed. This is recorded as "no flow time." The total time for the polymerization is manifested by shrinking of the polymer from the walls of the reaction vessel. Solutions of polymers made using the polymeric cocatalysts of the present invention in 90% formic acid contain gel particles indicating that cross-linking occurred during the polymerization.

The molecular weight of the polymers used as cocatalysts in the present invention is characterized by the inherent viscosity ($\eta_{inh}$) which is defined as follows:

$$\eta_{inh} = 2.303 \log \eta_r / C$$

where $\eta_r = (\eta_{solution})/(\eta_{solvent})$ and C is a concentration of 0.5 gram of polymer per 100 ml. of solvent. Unless otherwise indicated the solvent used is a mixture of tetrachloroethane and phenol (40/60 by weight).

The tensile strength of polymer specimens is determined using ASTM Method D-638 at 50% relative humidity.

| Example No. | Cocatalyst | | Catalyst | | No Flow Time (min.:sec.) | Tensile Strength (p.s.i.) | Elongation, Percent |
|---|---|---|---|---|---|---|---|
| | Name | Weight Percent | Name | Mole, Percent | | | |
| 1 | Phenyl acetate | 0.60 | NaH/oil | 2.0 | 2:15 | (1) | (1) |
| 2 | Phenyl benzoate | 0.88 | ---do--- | 2.0 | 1:45 | | |
| 3 | o-Nitrophenyl acetate | 0.88 | ---do--- | 2.0 | 1:45 | | |
| 4 | p-Nitrophenyl acetate | 0.88 | ---do--- | 2.0 | 2:15 | | |
| 5 | Pentachlorophenyl laurate | 0.88 | ---do--- | 2.0 | 3:15 | | |
| 6 | m-Phenylene dibenzoate | 0.70 | ---do--- | 1.0 | 3:30 | | |
|  |  | 0.70 | ---do--- | 2.0 | 1:45 | | |
| 7 | 1,2,3-Triacetoxybenzene | 0.88 | ---do--- | 2.0 | 1:15 | | |
| 8 | Diphenyl adipate | 0.88 | ---do--- | 2.0 | 8:45 | | |
| 9 | Diphenyl azelate | 0.88 | ---do--- | 1.0 | 4:00 | | |
| 10 | Diphenyl sebacate | 0.88 | ---do--- | 2.0 | 1:30 | 7,130 | 134 |
| 11 | Diphenyl phthalate | 0.88 | ---do--- | 2.0 | 2:45 | | |
| 12 | Diphenyl isophthalate | 0.88 | ---do--- | 2.0 | 1:30 | 7,130 | 98 |
| 13 | Diphenyl terephthalate | 0.88 | ---do--- | 2.0 | 1:45 | 6,840 | 78 |
| 14 | Diphenyl hexahydroisophthalate | 1.43 | ---do--- | 2.0 | 2:15 | | |
| 15 | Diphenyl cyclohexane-1,1-dicarboxylate | 1.43 | ---do--- | 2.0 | 3:45 | | |
| 16 | Diphenyl p,p'-dibenzoate | 1.06 | ---do--- | 2.0 | 1:15 | | |

[1] Measured at 50% R.H.

| Example No. | Cocatalyst Structure and Name | $\eta_{inh}$ | Catalyst Name | Catalyst Mol. Percent | Temp. (°C.) | No. Flow Time (min.:sec.) | Co-catalyst (wt. percent) |
|---|---|---|---|---|---|---|---|
| 17 | $[-O-C_6H_4-C(CH_3)_2-C_6H_4-O-CO-CH_2CH_2CH_2CH_2-CO-]$ Poly(diphenylolpropane adipate) | 0.30 | NaH/oil | 2.0 | 150 | 9:00 | 0.88 |
| 18 | $[-O-C_6H_4-C(CH_3)_2-C_6H_4-O-CO-C_6H_3(5\text{-}C(CH_3)_3)-CO-]$ Poly(diphenylolpropane 5-tert-butylisophthalate) | 1.54 | ...do.... | 2.0 | 150 | 1:45 | 0.88 |
| 19 | $[-CO-N(C_6H_5)-C_6H_4-N(C_6H_5)-CO-O-C_6H_4-O-]$ Poly[(hydroquinone N,N′-diphenyl)phenylene bis(carbamate)] [1] | 0.53 | ...do.... | 2.0 | 162 | 0:30 | 0.88 |
| 20 | $[-CO-N(C_6H_5)-C_6H_4-O-]$ Poly(1,4-phenylene N-phenylcarbamate) | 0.98 | ...do.... | 2.0 | 150 | 1:30 | 0.88 |
| 21 | $[-O-C_6H_4-C(CH_3)_2-C_6H_4-O-CO-C_6H_3(5\text{-}Cl)-CO-]$ Poly(diphenylolpropane 5-chloroisophthalate) | 0.48 | ...do.... | 2.0 | 150 | 2:30 | 0.44 |
| 22 | $[-O-C_6H_2Cl_2-C(CH_3)_2-C_6H_2Cl_2-O-CO-C_6H_3(5\text{-}Cl)-CO-]$ Poly(2,2′,6,6′-tetrachlorodiphenylolpropane 5-chloroisophthalate) | 0.38 | ...do.... | 2.0 | 150 | 3:30 | 0.44 |
| 23 | $[-O-C_6H_4-C(CH_3)(C_2H_5)-C_6H_4-O-CO-C_6H_4-CO-]$ Poly(diphenylolbutane isophthalate) | 0.36 | ...do.... | 2.0 | 150 | 2:00 | 0.44 |
| 24 | $[-O-C_6H_2Cl_2-C(CH_3)(C_2H_5)-C_6H_2Cl_2-O-CO-C_6H_4-CO-]$ Poly(2,2′6,6′-tetrachlorodiphenylolbutane terephthalate) | 0.90 | ...do.... | 2.0 | 150 | 2:45 | 0.44 |
| 25 | $[-O-C_6H_4-C(CH_3)_2-C_6H_4-O-CO-C_6H_4-CO-]$ Poly(diphenylolpropane terephthalate) | [2] 0.35 | ...do.... | 2.0 | 150 | 2:15 | 0.88 |

[1] Made as described in application Serial No. 236,393, filed November 8, 1962. [2] In tetrachloroethane.

Examples 26 and 27

The same procedure is used as in Examples 1 through 25 except that different lactams are polymerized. The total quantity of lactams used is identical on a molar basis to the quantity of lactam used in the Examples 1 through 25.

The same procedure is used as in Example 27 except that poly(diphenylolpropane 1,4-cyclohexanedicarboxylate) is used as the cocatalyst. Similar results are obtained.

| Example No. | Lactam | Temp., °C. | Mol. Percent NaH | Cocatalyst | Weight Percent | No Flow Time (seconds) |
|---|---|---|---|---|---|---|
| 26 | ω-Laurolactam | 160 | 1.5 | Diphenyl isophthalate | 0.88 | 20 |
| 27 | ε-Caprolactam 50 mol. percent<br>ω-Caprylolactam 50 mol. percent | 152 | 1.5 | Poly(diphenylolpropane 5-chloroisophthalate) | 0.88 | 35 |

Example 28

Caprolactam (70 parts) is melted and a 50/50 sodium hydride/white mineral oil mixture (1.19 parts) and potassium stearate (4.2 parts) is added. The molten lactam is sparged with nitrogen while heating to 150° C.

Another 70 part portion of molten caprolactam lactam is mixed with 70 parts of precipitated calcium carbonate (average particle size —2 microns) and 1.98 parts of diphenyl isophthalate and heated to 150° C. while sparging with nitrogen. Dodecenyl azide (1.69 parts) is added, and sparging continued for 10 minutes. The two portions of molten lactam are mixed and poured into a mold held at 150° C. After 5 minutes the mold is dismantled. A section of foamed polycaprolactam having a density of 0.67 g./cc. is removed from the mold.

I claim:

1. In the process for the anhydrous polymerization of a lactam to polyamides in the presence of lactam-base salts at a temperature between the melting point of said lactam and the melting point of said polyamide, the improvement which comprises carrying out said polymerization in the presence of from about 0.1 to 5 weight percent of an aromatic ester cocatalyst free of non-benzenoid unsaturation and having an exocyclic carboxylate group bonded through the ether oxygen therein directly to carbocyclic aromatic carbon, the carbonyl carbon in said carboxylate group bonded to any radical in the remainder of the ester being bonded to one of the group consisting of carbon and tertiary nitrogen the other two substituents on said tertiary nitrogen being aliphatically saturated, any acyclic chain separating said carboxylate group from another such carboxylate group bearing at least four carbon atoms in said chain.

2. A process for the anhydrous polymerization of a lactam to a polyamide which comprises heating said lactam in the presence of a lactam base salt and from about 0.1 to 5 weight percent of an aromatic ester cocatalyst at a temperature between the melting point of said lactam and the melting point of said polyamide, said aromatic ester free of non-benzenoid unsaturation of having at least one exocyclic carboxylate group per 30 carbon atoms, said carboxylate group being bonded through the ether oxygen therein directly to carbocyclic aromatic carbon, the carbonyl carbon in said carboxylate group bonded to any radical in the remainder of the ester being bonded to one of the group consisting of carbon and tertiary nitrogen the other two substituents on said tertiary nitrogen being aliphatically saturated, any acyclic chain separating said carboxylate group from another such carboxylate group bearing at least four carbon atoms.

3. A process of claim 2 wherein said aromatic ester is an ester of a phenol and an organic discarboxylic acid.

4. A process of claim 2 wherein said aromatic ester is an ester of a phenol and a carbocyclic dicarboxylic acid.

5. A process of claim 4 wherein said aromatic ester is diphenyl isophthalate.

6. A process of claim 2 wherein said aromatic ester is an ester of a phenol and an aliphatic dicarboxylic acid having at least four carbon atoms between any two carboxyl groups.

7. A process of claim 2 wherein said aromatic ester is a polymer composed of the repeating structural unit

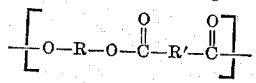

wherein R is an aromatic biradical bonded by carbocyclic aromatic carbon directly to the oxygen atoms adjacent thereto and R' is selected from the group consisting of aromatic, aliphatic and cycloaliphatic biradicals bonded by at least one of the group consisting of carbon and tertiary nitrogen the other two substituents on said tertiary nitrogen being aliphatically saturated directly to the carbonyl radicals adjacent thereto said polymer having an inherent viscosity from about 0.05 to about 5 and wherein said viscosity is determined as follows:

$$\eta_{inh} = (2.303 \log \eta_r)/C$$

wherein $\eta_r = (\eta_{solution})/(\eta_{solvent})$ and C is a concentration of 0.5 gram of polymer per 100 ml. of solvent, said solvent being a mixture of tetrachloroethane and phenol (40/60 by weight).

8. A process of claim 7 wherein said polymer is poly(diphenylolpropane isophthalate).

9. A process of claim 7 wherein said polymer is poly[(hydroquinone N,N' - diphenyl)phenylene bis(carbamate)].

10. A process of claim 2 wherein said lactam is ε-caprolactam.

11. A process of claim 2 wherein said lactam-base salt is formed by the reaction of sodium hydride with lactam.

12. A process of claim 2 wherein said lactam-base salt is formed by the reaction of sodium methoxide with lactam.

13. A process of claim 2 wherein said aromatic ester containing a carbonyl carbon in said carboxylate group is bonded to carbon.

References Cited by the Examiner
UNITED STATES PATENTS

| | | | |
|---|---|---|---|
| 3,036,046 | 5/1962 | Glickman et al. | 260—78 |
| 3,037,003 | 5/1962 | Griehl | 260—78 |
| 3,207,713 | 9/1965 | Hyde | 260—78 |

FOREIGN PATENTS 900,151  7/1962  Great Britain.

WILLIAM H. SHORT, Primary Examiner.
SAMUEL H. BLECH, Examiner.
H. D. ANDERSON, Assistant Examiner.